United States Patent [19]

Natori et al.

[11] Patent Number: 5,748,267
[45] Date of Patent: May 5, 1998

[54] COMMON GATE LINE LAYOUT METHOD FOR LIQUID CRYSTAL DISPLAY DEVICE WITH GATE SCANNING DRIVER CIRCUIT ON A DISPLAY SUBSTRATE

[75] Inventors: Masataka Natori, Mobara, Japan; Shunichi Kumaoka, Cupertino, Calif.; Shiro Ueda, Mobara, Japan

[73] Assignee: Hitachi, Ltd., Tokyo, Japan

[21] Appl. No.: 517,930

[22] Filed: Aug. 22, 1995

[30] Foreign Application Priority Data

Sep. 7, 1994  [JP]  Japan .................... 6-213664

[51] Int. Cl.$^6$ .............. G02F 1/1333; G02F 1/136; G02F 1/1345; G02F 1/13
[52] U.S. Cl. .............. 349/40; 349/42; 349/149; 349/151; 349/187
[58] Field of Search .............. 359/59; 349/40, 349/149, 151, 155, 42, 187

[56] References Cited

U.S. PATENT DOCUMENTS

| | | | |
|---|---|---|---|
| 5,194,136 | 3/1993 | Jeung et al. | 205/122 |
| 5,200,847 | 4/1993 | Mawatari et al. | 359/59 |
| 5,327,267 | 7/1994 | Aoki et al. | 349/42 |
| 5,359,206 | 10/1994 | Yamamoto et al. | 349/143 |
| 5,397,719 | 3/1995 | Kim et al. | 437/40 |
| 5,422,293 | 6/1995 | Konya | 437/50 |
| 5,504,348 | 4/1996 | Yoshida et al. | 359/59 |
| 5,504,601 | 4/1996 | Watanabe et al. | 349/155 |
| 5,541,748 | 7/1996 | Ono et al. | 359/59 |
| 5,546,013 | 8/1996 | Ichioka et al. | 324/770 |

*Primary Examiner*—William L. Sikes
*Assistant Examiner*—Walter Malinowski
*Attorney, Agent, or Firm*—Antonelli, Terry, Stout, & Kraus, LLP

[57] ABSTRACT

A liquid crystal display capable of accommodating a common gate line in a proper position during the manufacture thereof has two transparent substrates opposed across a liquid crystal; a set of parallel gate lines extending in an x-direction on the surface of one of the transparent substrates, which faces the liquid crystal; a set of parallel drain lines extending in the y-direction on the surface and being insulated from the gate lines; and a gate scanning driver circuit connected with the individual gate lines outside of the display region in which the gate line set and the drain line set intersect. The common gate line is formed over a peripheral surface portion of the one transparent substrate, which surface portion is to be cut off at a subsequent manufacturing step, and is mounted on a region opposite to the gate scanning driver circuit on the other side of the display region therefrom for connecting the individual gate lines of the gate line set in common.

21 Claims, 4 Drawing Sheets

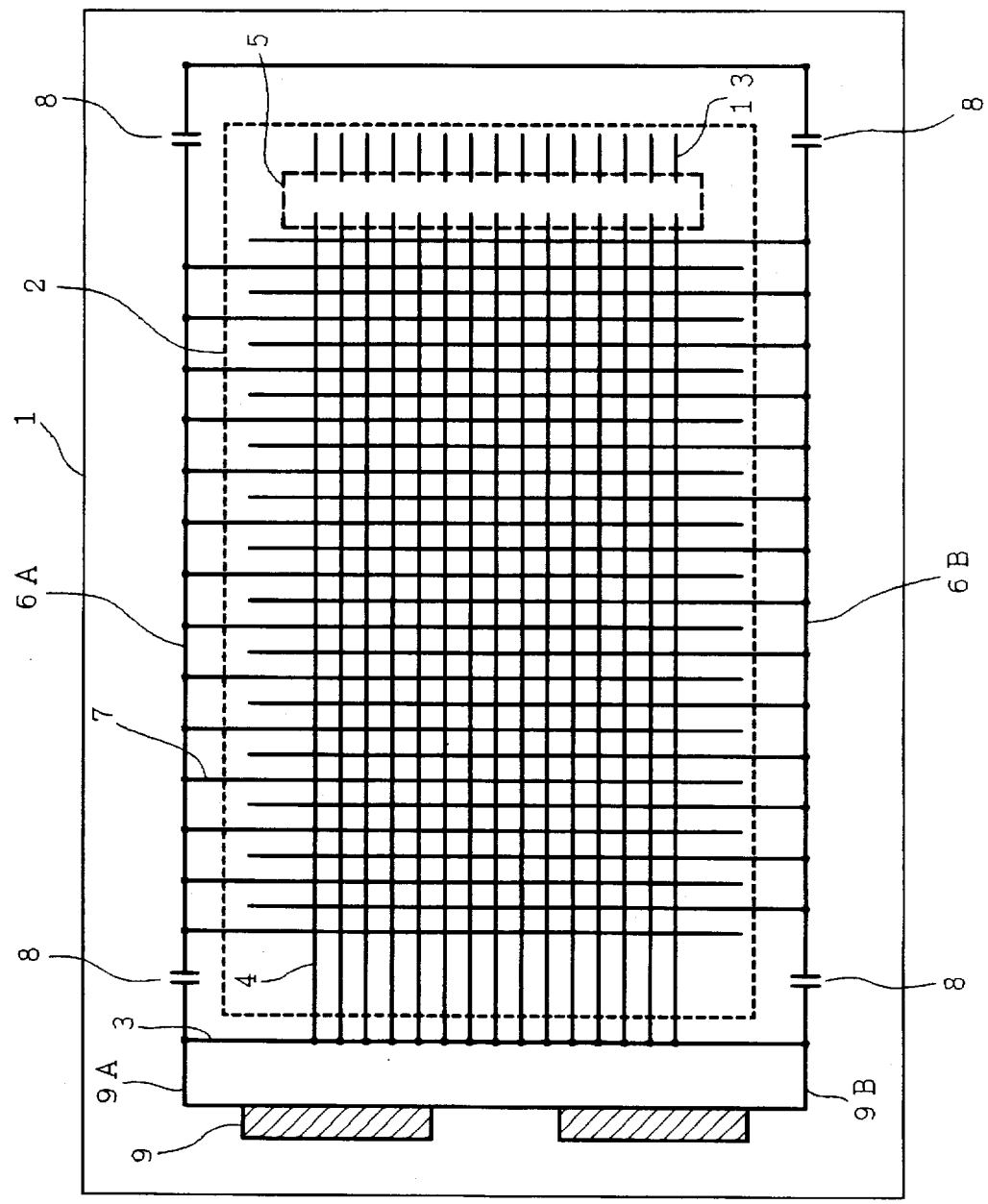

COMMON GATE LINE LAYOUT METHOD FOR LIQUID CRYSTAL DISPLAY DEVICE WITH GATE SCANNING DRIVER CIRCUIT ON A DISPLAY SUBSTRATE

BACKGROUND OF THE INVENTION

The present invention relates to a liquid crystal display substrate and, more particularly, to a common gate line layout method for use in manufacturing a liquid crystal display device having a gate scanning driver circuit on a display substrate.

In an active matrix type liquid crystal display substrate, for example, one of two transparent substrates arranged to confront each other with a liquid crystal disposed therebetween has formed on the surface thereof facing the liquid crystal a set of gate lines extending in an x-direction and juxtaposed in a y-direction and a set of drain lines extending in the y-direction, while being insulated from the gate line set, and juxtaposed in the x-direction.

Moreover, the individual regions enclosed by the gate line set and drain line set provide pixel regions which are formed with thin film transistors (TFT) and pixel electrodes.

When scanning signals are fed to the gate lines, the thin film transistors are turned ON so that video signals are fed from the drain lines to the pixel electrodes through the ON thin film transistors.

Incidentally, not only the individual drain lines of the drain line set but also the individual gate lines of the gate line set are extended to the periphery of the liquid crystal display substrate to form external terminals, and a video driver circuit and a gate scanning driver circuit are so attached to the periphery of the liquid crystal display substrate as to be connected with those external terminals.

In the process for manufacturing the liquid crystal display substrate thus constructed, moreover, static electricity is dispersed by forming the gate line set integrally with a common gate line because the thin film transistors are seriously affected by static electricity. Then, this common gate line is removed at the stage of manufacture when the aforementioned trouble is no longer a factor.

However, this liquid crystal display substrate is constructed such that the video driver circuit and the gate scanning driver circuit are externally attached to the periphery thereof. Thus, it has been pointed that the area to be occupied by the region (usually called the "frame portion") between the contour of the display region of the liquid crystal display substrate and the contour of the module supporting the liquid crystal display substrate is enlarged by those circuits.

In order to solve such problems as much as possible, therefore, there has been tried a construction in which the gate scanning driver circuit is mounted on the liquid crystal display substrate.

As a result, in the process of manufacturing the liquid crystal display substrate, the gate lines to be formed on the liquid crystal display substrate are cut in their extending direction outside of the mounting region of the gate scanning driver circuit. Thus, there arises the problem of determining on what region the common gate line is to be formed.

SUMMARY OF THE INVENTION

The present invention has been conceived in view of such problems and has an object to provide a liquid crystal display substrate which can form a common gate line in a proper position.

In order to achieve this object, according to the present invention, there is basically provided a liquid crystal display substrate comprising: two transparent substrates disposed on either side of a liquid crystal; a set of gate lines extending in an x-direction on that surface of one of the transparent substrates which faces the liquid crystal; a set of parallel drain lines extending in the y-direction and being insulated from the set of gate lines; a gate scanning driver circuit connected with the individual gate lines outside of the display region in which the gate lines and the drain lines intersect; and a common gate line formed over the transparent substrate, which is to be cut off at a subsequent step of manufacture, and mounted on a region opposed to the gate scanning driver circuit across the display region for connecting the individual gate lines of the gate line set in common.

According to the embodiment thus constructed, the common gate line is formed in the region on the other side of the display region from the gate scanning driver circuit so that the influence of the static electricity can be suppressed by that common gate line.

In case the individual gate lines are to be tested for breakage, on the other hand, the end portion at the display region side in the vicinity of the gate scanning drive mounting region can be employed as the terminal.

Thus, the common gate line can be formed in a proper position.

The foregoing and other objects, advantages, manner of operation and novel features of the present invention will be understood from the following detailed description when read in connection with the accompanying drawings.

BRIEF DESCRIPTION OF THE DRAWINGS

FIG. 4 is a top plan view showing another embodiment of the liquid crystal display substrate according to the present invention.

DESCRIPTION OF THE PREFERRED EMBODIMENTS

Figure 2:
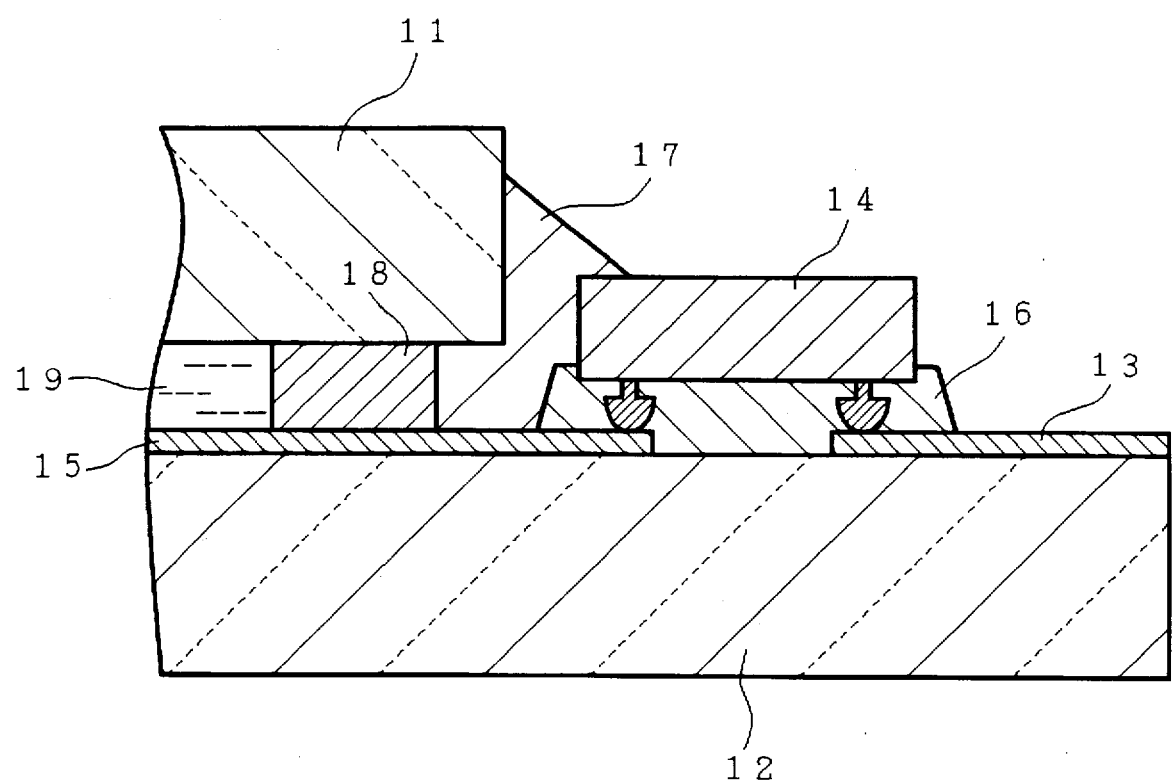
FIG. 2 is a section view showing one embodiment of a liquid crystal display device to which is applied the liquid crystal display substrate according to the present invention.

First of all, FIG. 2 is a section showing the construction of one embodiment of a liquid crystal display device to which is applied a liquid crystal display substrate according to the present invention. Here, this liquid crystal display device is exemplified by an active matrix type liquid crystal display device.

In FIG. 2, there is shown a lower glass substrate 12, over the principal surface of which is arranged an upper glass substrate 11 with a liquid crystal layer 19 being disposed therebetween. The clearance between the lower glass substrate 12 and the upper glass substrate 11 is retained by a spacer 18, which also has a function to confine the liquid crystal layer 19 between the glass substrates 12 and 11.

Incidentally, the lower glass substrate 12 is formed to extend outward more than the upper glass substrate 11 around the periphery thereof. On this extension portion there is mounted a gate scanning driver circuit 14, as will be described hereinafter.

The region confining the liquid crystal layer 19 forms a display region, in which there is formed a gate line 15 on the surface of the lower glass substrate 12. This gate line 15 extends so far below the spacer 18 and onto the surface of the extension of the lower glass substrate 12.

Incidentally, the surface of the lower glass substrate 12 formed with the gate line 15 is further formed, although not shown, with a drain line which is insulated from the gate line, but, extends perpendicularly thereto. This drain line also, extends below the spacer 18 and onto the surface of the extension of the lower glass substrate 12.

Moreover, the surface of the extension of the lower glass substrate 12 is further provided with a terminal 13, and the aforementioned gate scanning driver circuit 14 is mounted over the gate line 15 and the terminal 13 by so-called "face-down bonding" through an anisotropic conductor 16.

In order to prevent any penetration of moisture, moreover, the space between the gate scanning driver circuit 14 and the upper glass substrate 11 is sealed with a resin 17.

Figure 1:
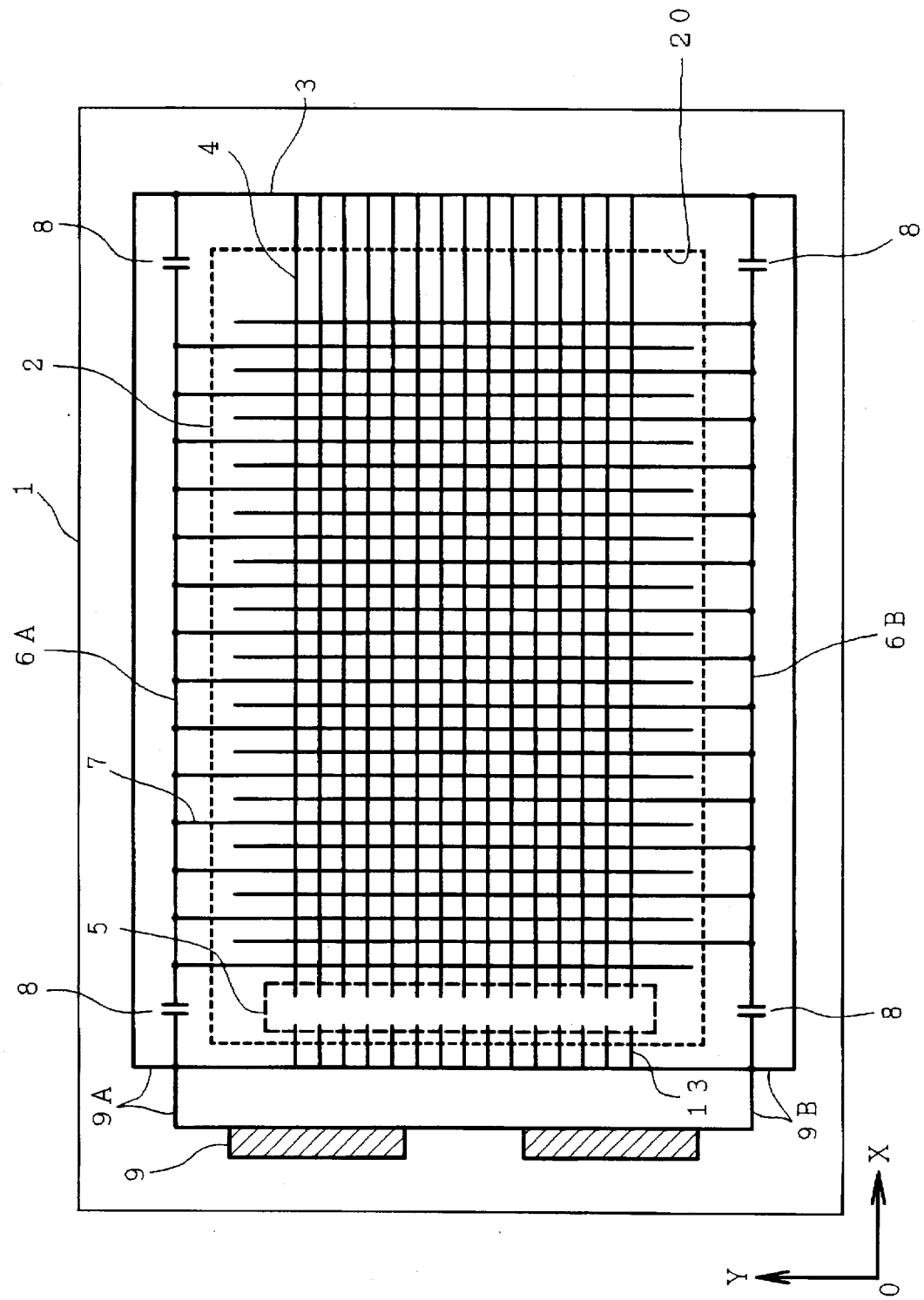
FIG. 1 is a top plan view showing one embodiment of a liquid crystal display substrate according to the present invention.

FIG. 1 is a top plan view showing one embodiment of the liquid crystal display substrate during the process of working the surface of the aforementioned lower glass substrate 12.

In FIG. 1, a liquid crystal display substrate 1 has a larger area than that of the lower glass substrate 12 shown in FIG. 2 and is cut at a portion 20, indicated by broken lines, in a subsequent manufacturing step and the outer portion is then disposed of.

The liquid crystal display substrate 1 is firstly formed at a central portion other than its periphery, with a set of gate lines 4, which extend in an x-direction and are juxtaposed in a y-direction, and a set of drain lines 7, which extend in the y-direction and are juxtaposed in the x-direction.

Both the individual gates lines of each set and the individual drain lines of each set are formed to extend over the cut portion 20, as indicated by the broken lines.

Although not shown, the gate line set and drain line set are insulated from each other through an inter-layer insulating film.

Incidentally, the intersecting portions between the gate line set and the drain line set constitute the display region, and the pixel regions are formed in the regions which are defined by the adjoining gate lines and drain lines.

Specifically, each pixel region is formed of a thin-film transistor (TFT) and a pixel electrode. When a scanning signal is fed to the gate line, the thin-film transistor is turned ON so that a video signal is fed from the drain line to the pixel electrode through the ON thin-film transistor.

The individual drain lines extend alternately in opposite directions over the aforementioned cut portion 20 so that they are individually connected to common drain lines 6A and 6B extending in the x-direction. As a result, these common drain lines 6A and 6B are individually formed on that surface of the glass substrate 1, which is to be cut off at and a manufacturing step, so that static electricity generated in the individual drain lines can be dispersed through the common drain lines 6A and 6B.

Of the regions forming the individual gate lines 4, a portion inside of the cut portion 20 which is located close to the cut portion at the lefthand side provides a region 5 for mounting the gate scanning driver circuit 14. The individual gate lines 4 in the mounting region 5 are then electrically connected to the output pads of the gate scanning driver circuit 14 but are electrically isolated from the input terminal portions 13, which in turn are connected to the input pads. These terminal portions 13 are cut in their extending direction.

The individual gate lines 4 are connected at their extending end portions, opposite to the mounting portion 5 and outside of the cut portion 20, with a common gate line 3 which extends in the y-direction, as shown. As a result, the common gate line 3 is also formed on that surface of the glass substrate 1 which is to be cut off and disposed of at the subsequent manufacturing step, so that the static electricity generated in the individual gate lines can be dispersed through the common gate line 3.

On the other hand, the common gate line 3 thus formed and the aforementioned common drain lines 6A and 6B are coupled through capacitors 8 on that surface of the glass substrate 1 which is also cut off and disposed of at the subsequent manufacturing step.

These capacitors 8 are provided for protecting the thin-film transistors in the individual pixel regions from damage due to static electricity; therefore, they should have smaller capacitance than the thin film transistors.

The two ends of the common gate line 3 are electrically connected with lines 9A and 9B, which extend from anodizing pads 9. These anodizing pads 9 and lines 9A and 9B are used to supply electric current for anodizing the surfaces of the gate lines 4.

The portions of the conductor layout pattern, which are brought into direct contact with the chemical liquid, are anodized. In the present embodiment, most of the gate layout lines 4 to be electrically connected to the common gate line are anodized. The input terminal portions 13 to the gate scanning driver circuit 14 are covered with the resist during anodizing, for example, so as to be free from contact with the chemical liquid so that the conductor layer is left on their surfaces. These terminals 13 are later connected to a flexible substrate or the like and are fed with input signals.

Figure 3:
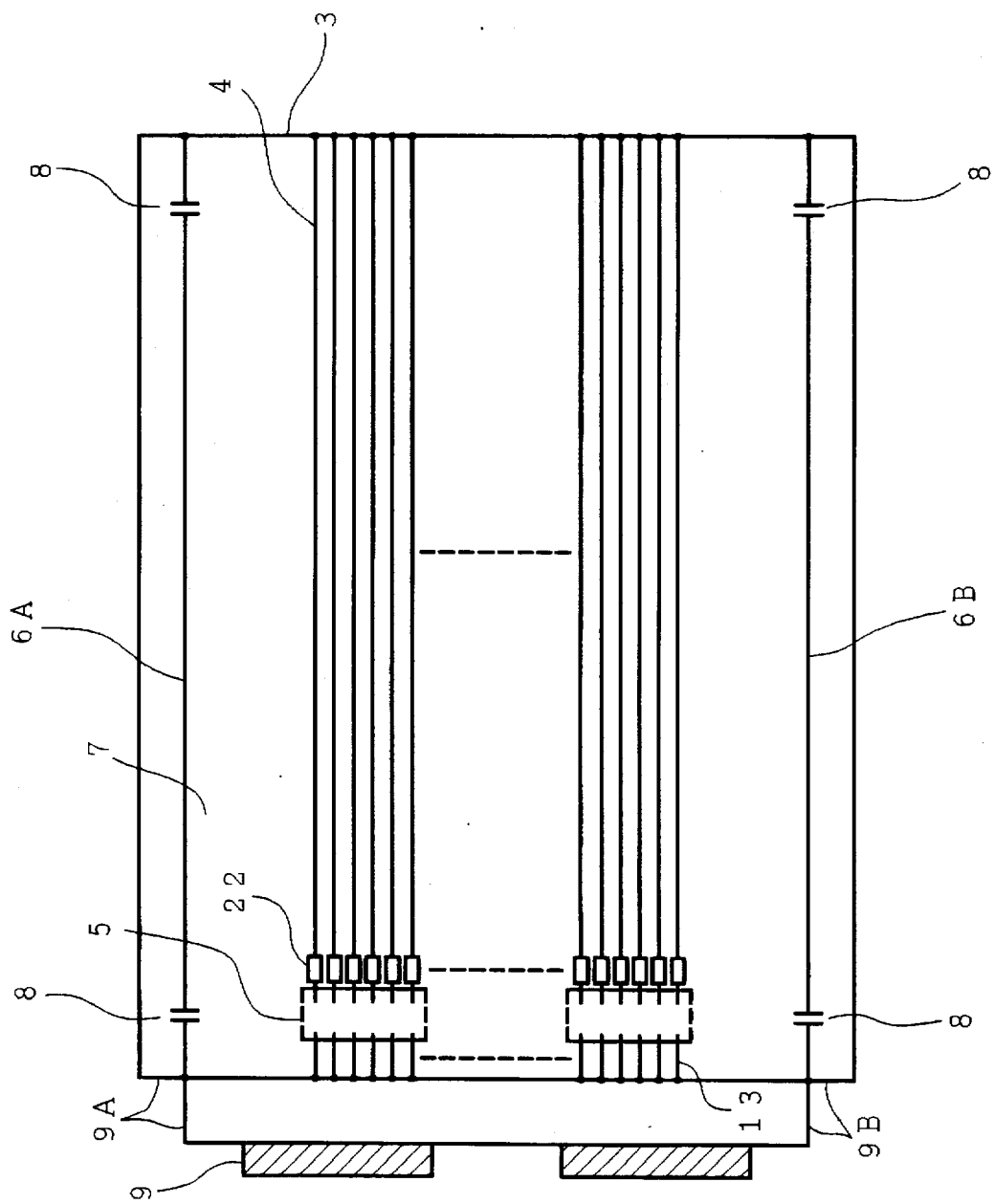
FIG. 3 is a diagrammatic view showing an essential portion of one embodiment of the liquid crystal display substrate according to the present invention.

The liquid crystal display substrate 1 thus constructed is checked for breaks in the gate lines 4, and for this purpose it has test terminals 22 which are located at the end portion of the display region in the vicinity of the regions 5 for mounting the gate scanning driver circuits, as shown in FIG. 3. The test terminals 22 are formed in such a manner that the lefthand side of FIG. 3, including the test terminals 22 and the input terminals 13 but not the pads 9, is covered with a resist during their formation so that no insulating film may be formed.

As a result, whether or not the individual gate lines 4 have been broken can be tested by bringing one probe into abutment against the side of the common gate lines 3 and another probe sequentially into abutment against the individual test terminals 22 of the gate lines 4.

According to the embodiment thus described, a common gate line is formed in the region on the other side of the display region from the gate scanning driver circuit so that the influence of static electricity can be suppressed by that common gate line.

In case of the individual gate lines are to be tested for breakage, on the other hand, the end portion at the display region side in the vicinity of the gate scanning drive mounting region can be employed as a terminal.

Thus, a common gate line can be formed in a proper position.

In the embodiment thus far described, the gate scanning driver circuit mounting region 5 is formed at the lefthand side, while the common gate line 3 is formed at the righthand side. The arrangement should not be limited thereto, but similar effects can naturally be achieved even if the arrangement is reversed, as shown in FIG. 4.

According to the liquid crystal display substrate thus far described according to the present invention, a common gate line can be formed in a proper position.

We claim:

1. A liquid crystal display device having two substrates opposed across a liquid crystal, wherein at least one of the two substrates is transparent, comprising:

a set of parallel gate lines extending in an x-direction over a surface of one of said substrates, a set of parallel drain lines extending in the y-direction over the surface of said one substrate and being insulated from said gate lines;

a gate scanning driver circuit connected to individual ones of said gate lines outside of a display region in which said gate lines and said drain lines intersect; and a spacer region surrounding the display region, said spacer region being interposed between the gate scanning driver circuit and the display region on one side of the display region, wherein said parallel gate lines extend through a mounting area from the gate scanning driver circuit through the spacer region into said display region on said one side of the display region, wherein said parallel gate lines further extend past the spacer region outside of said display region on another side of the display region, and wherein said parallel gate lines are anodized in an area where the gate lines extend past the spacer region on said another side of the display region, and are unanodized in said mounting area where the gate lines extend beyond the spacer region to the gate scanning driver circuit on said one side of the display region.

2. A liquid crystal display device according to claim 1, wherein said set of gate lines includes test terminals disposed between said display region and said mounting region.

3. A liquid crystal display device according to claim 1, wherein a common gate line is formed over a region of the substrate which is to be cut off at a subsequent step of manufacturing said liquid crystal display device, said region being disposed on said another side of said gate scanning driver circuit from said display region, said common gate line connecting the individual gate lines of said gate line set in common to anodize the individual gate lines.

4. A liquid crystal display device having two substrates opposed across a liquid crystal, wherein at least one of the two substrates is transparent, comprising:

a set of parallel gate lines extending in an x-direction over a surface of one of said substrates;

a set of parallel drain lines extending in the y-direction over the surface of said one substrate and being insulated from said gate lines;

a gate scanning driver circuit connected to individual ones of said gate lines outside of a display region in which said gate lines and said drain lines intersect;

input terminal portions, and a spacer region surrounding the display region, said spacer region being interposed between the gate scanning driver circuit and the display region on one side of the display region, wherein said parallel gate lines extend through a mounting area from the gate scanning driver circuit through the spacer region into said display region on said one side of the display region, wherein said parallel gate lines further extend past the spacer region outside of said display region on another side of the display region, and wherein said parallel gate lines are anodized in an area where the gate lines extend past the spacer region on said another side of the display region, and are unanodized in said mounting area where the gate lines extend beyond the spacer region to the gate scanning driver circuit on said one side of the display region.

5. A liquid crystal display device according to claim 4, wherein the input terminals are formed of the same material as said gate lines and are formed at a side of a mounting region away from a cutting portion where said one substrate is cut after manufacture.

6. A liquid crystal display device according to claim 1 or claim 4, wherein a gate material forming said gate lines is comprised of aluminum, and an anodization film formed over said gate lines is comprised of aluminum oxide.

7. A method of manufacturing a liquid crystal display device having two substrates wherein at least one of the two substrates is transparent opposed across a liquid crystal, and having a display region formed by intersections of parallel gate lines and parallel drain lines, comprising the steps of:

forming patterns of a set of parallel gate lines extending in an x-direction, input terminal portions, and a common gate line in one photolithography step over a surface of one of said substrates, wherein a mounting region for a gate scanning driver circuit is formed on one side of said display region and the common gate line is formed at the other side of the display region outside of a predetermined cutting line along which the one substrate will be cut after manufacture, wherein the common gate line connects the gate lines in common;

coating a resist over portions of the gate lines in the mounting region and the input terminal portions to leave these portions unanodized;

forming an anodic oxide film on a surface and edges of the portions of each of the gate lines at said other side of the display region by applying an anodic voltage through the common gate line, taking off the resist;

forming a set of parallel drain lines extending in a y-direction over the surface of the one substrate, said drain lines being insulated from said gate lines; and cutting away a portion of the substrate on which said common gate line is formed.

8. A method according to claim 7, further including the step of forming test terminals in contact with respective gate lines between said display region and said gate scanning driver circuit region, and the step of coating the resist over the test terminals.

9. A method according to claim 7, wherein the input terminal portions are formed of gate material and are formed inside the cut portion.

10. A method according to claim 7, wherein a gate material forming said gate lines is comprised of aluminum, and an anodization film formed over said gate lines is comprised of aluminum oxide.

11. An intermediate product used in forming a liquid crystal display device having two substrates opposed across a liquid crystal, wherein at least one of the two substrates is transparent, comprising:

a set of parallel gate lines extending in an x-direction over a surface of said one substrate;

a set of parallel drain lines extending in the y-direction over the surface of said one substrate and being insulated from said gate lines;

a gate scanning driver circuit mounted over said one substrate and connected to individual ones of said gate lines outside of a display region in which said gate lines and said drain lines intersect; and a spacer region surrounding the display region, said spacer region being interposed between the gate scanning driver circuit and the display region on one side of the display region, wherein said parallel gate lines extend through a mounting area from the gate scanning driver circuit through the spacer region into said display region on one side of the display region, wherein said parallel gate lines further extend past the spacer region outside of said display region to a portion of said one substrate on another side of the display region which portion will be cut-off during a subsequent manufacturing step of said liquid crystal display device, and wherein said parallel gate lines are anodized in said display region, and are unanodized in said mounting area where the gate lines extend beyond the spacer region to the gate scanning driver circuit on said one side of the display region.

12. A product according to claim 11, wherein said parallel gate lines are covered by an insulating film in an area where the gate lines extend past the spacer region on said another side of the display region.

13. A product according to claim 12, wherein said insulating film is an anodization film formed over said gate lines.

14. A product according to claim 11, wherein a common gate line is formed over said portion of the one substrate which will be cut off at a subsequent step of manufacturing said liquid crystal device, said portion being disposed on said another side of said gate scanning driver circuit from said display region, said common gate line connecting the individual gate lines of said gate line set in common.

15. A product according to claim 14, wherein an anodization voltage is applied to said common gate line.

16. A product according to claim 11, further comprising input terminal portions formed of the same material as said gate lines at a side of a mounting region.

17. A product according to claim 16, wherein said input terminal portions are formed away from said portion of said one substrate which will be cut off.

18. A liquid crystal display device having two substrates wherein at least one of the two substrates is transparent opposed across a liquid crystal, and having a display region formed by intersections of parallel gate lines and parallel drain lines, wherein the liquid crystal display device is formed by the process of:

forming patterns of a set of parallel gate lines extending in an x-direction, input terminal portions, and a common gate line in one photolithography step over a surface of one of said substrates, wherein a mounting region for a gate scanning driver circuit is formed on one side of said display region and the common gate line is formed at the other side of the display region outside of a predetermined cutting line along which the one substrate will be cut after manufacture, wherein the common gate line connects the gate lines in common;

forming a set of parallel drain lines extending in a y-direction over the surface of the one substrate, said drain lines being insulated from said gate lines; and cutting away a portion of the one substrate on which said common gate line is formed wherein the parallel gate lines extend to the edge of the one substrate which edge is formed along a line at which the one substrate is cut, wherein the method for forming the device further includes the step of forming test terminals in contact with respective gate lines between said display region and said gate scanning driver circuit region, and the step of coating the resist over the test terminals.

19. A liquid crystal display device according to claim 18, wherein the input terminal portions are formed of gate material and are formed inside the cut portion.

20. A liquid crystal display device according to claim 18, wherein a gate material forming the gate lines is comprised of aluminum, and an anodization film formed over said gate lines is comprised of aluminum oxide.

21. A liquid crystal display device having two substrates wherein at least one of the two substrates is transparent opposed across a liquid crystal, and having a display region formed by intersections of parallel gate lines and parallel drain lines, wherein the liquid crystal display device is formed by the process of:

forming patterns of a set of parallel gate lines extending in an x-direction, input terminal portions, and a common gate line in one photolithography step over a surface of one of said substrates, wherein a mounting region for a gate scanning driver circuit is formed on one side of said display region and the common gate line is formed at the other side of the display region outside of a predetermined cutting line along which the one substrate will be cut after manufacture, wherein the common gate line connects the gate lines in common;

forming a set of parallel drain lines extending in a y-direction over the surface of the one substrate, said drain lines being insulated from said gate lines; and cutting away a portion of the one substrate on which said common gate line is formed wherein the parallel gate lines extend to the edge of the one substrate which edge is formed along a line at which the one substrate is cut, wherein the method for forming the device further includes:

coating a resist over portions of the gate lines in the mounting region and the input terminal portions to leave these portions unanodized;

forming an anodic oxide film on a surface and edges of the portions of each of the gate lines at said other side of the display region by applying an anodic voltage through the common gate line, taking off the resist.

* * * * *